United States Patent
Hirota et al.

(10) Patent No.: US 7,245,722 B2
(45) Date of Patent: Jul. 17, 2007

(54) SYSTEM AND METHOD FOR DISTRIBUTING KEY

(75) Inventors: Osamu Hirota, Yokohama (JP); Yasuharu Shimizu, Tokyo (JP); Masaki Sohma, Yokohama (JP)

(73) Assignees: Osamu Hirota, Kanagawa (JP); Matsushita Electric Industrial Co., Ltd., Osaka (JP)

( * ) Notice: Subject to any disclaimer, the term of this patent is extended or adjusted under 35 U.S.C. 154(b) by 1195 days.

(21) Appl. No.: 09/971,077

(22) Filed: Oct. 5, 2001

(65) Prior Publication Data

US 2002/0048370 A1    Apr. 25, 2002

(30) Foreign Application Priority Data

Oct. 6, 2000  (JP)  ............ P 2000-308158

(51) Int. Cl.
*H04K 1/00*  (2006.01)
(52) U.S. Cl. .................. 380/256; 380/278
(58) Field of Classification Search ........... 380/255, 380/256, 278, 287
See application file for complete search history.

(56) References Cited

U.S. PATENT DOCUMENTS 5,757,912 A * 5/1998 Blow ............ 380/256
5,850,441 A * 12/1998 Townsend et al. ....... 380/283
6,271,946 B1 * 8/2001 Chang et al. ........... 398/79

OTHER PUBLICATIONS

Shor, P. (1996) *Polynomial-Time Algorithms for Prime Factorization and Discrete Logarithms on a Quantum Computer*, Factoring with a Quantum Computer, arXiv:quant-ph/9508027v2, Jan. 25, 1996, pp. 1-27.
Neilsen, M. A. and Chuang, I. L., *Quantum Computations and Quantum Informatics*, pp. 36-39, 226-227.
Bennett, C. H. and Brassard, G. *Quantum Cryptography: Public Key Distribution and Coin Tossing*, International Conference on Computers, Systems and Signal Processing. Bangalore, India Dec. 10-12, 1984. pp. 175-179.
Yuen, H. P. and Kim, A. M. *Classical noise-based cryptography similar to two-state quantum cryptography*, Physics Letters A 241 (1998) pp. 135-138.

* cited by examiner

*Primary Examiner*—David Y. Jung
*Assistant Examiner*—Thomas Ho
(74) *Attorney, Agent, or Firm*—Browdy and Neimark, PLLC

(57) ABSTRACT

A method and system for distributing a key is provided which make use of effects of noise caused at the time of transmitting or receiving a signal to send a key. A transmission signal is amplified at a plurality of stages while the relationship between the transmission signal and noise is being maintained at a level enough to satisfy predetermined criteria for security measures against eavesdropping activities, and the key is sent over a long distance. The aforementioned operation makes it possible to transmit or distribute a key over a long distance while maintaining the relationship between the transmission signal and noise at a level enough to satisfy the criteria for security measures against eavesdropping activities.

5 Claims, 5 Drawing Sheets

SYSTEM AND METHOD FOR DISTRIBUTING KEY

BACKGROUND OF THE INVENTION

1. Field of the Invention

The present invention relates to systems for distributing a key using a transmission channel employing electrons, electromagnetic waves, or photons as a transmission medium. More particularly, the present invention relates to a system and method for distributing a key which function to amplify a transmission signal to realize the distribution of a key over a long distance while maintaining the relation between the signal and noise to satisfy predetermined criteria for security measures against eavesdropping activities.

2. Description of Prior Art

As conventional techniques, described below are the open key cryptography, quantum cryptography, YK protocol. As an encryption scheme that has widely come into widespread use today, the open key cryptography is available. As is well known, the open key cryptography assures security from the viewpoint of the amount of calculations based on the fact that currently available computers are incapable of factoring a large number into its prime components in real time. However, in 1994, P. W. Shor discovered a quantum calculation algorism for factoring numbers into their prime components, thereby leading to an increase in insecure feeling about the open key cryptography as well as in expectation on quantum cryptography. The quantum cryptography assures security in accordance with the quantum mechanical principle, and several transmission protocols have been suggested until now (refer to C. H. Bennet and G. Brassard, "Proceedings of IEEE International Conference on Computers, System and Signal Processing", Bangolore, India (IEEE New York, 1984), pp175) However, in order to assure absolute security by means of quantum cryptography, it is necessary to control a single photon, which is extremely difficult to realize using current techniques. In addition, conventional amplifiers cannot be used in principle for communications even using very weak light instead of a single photon and therefore only an experimental key distribution has been successfully carried out over about several tens of kilometers until now. This has been a major stumbling block in the course of putting the quantum cryptography into practical use.

In contrast to this, H. P. Yuen and A. M. Kim from Nothwestern University suggested an encryption scheme (YK protocol) for generally realizing the same function using classical noise as that of the quantum cryptography. (Refer to H. P. Yuen and A. M. Kim, "Classical noise-based cryptography similar to two-state quantum cryptography", Physics Letter A. 241, pp135-138 (1998)). Now, the YK protocol is explained below.

FIG. 1 is a block diagram illustrating the configuration of a system based on YK protocol. The system includes a transmission-side key generator portion 206 for performing processing on the distribution of a key such as generating a "0" and "1" bit train in accordance with the protocol of encrypted code transmission. The system also includes a modulator 204 for performing modulation in accordance with the bit train delivered from the transmission-side key generator portion 206 and an optical transmitter 202 for transmitting the modulated signal as an optical signal. The system further includes an optical transmission channel 201 for transmitting the optical signal and an optical receiver 203 for receiving the optical signal transmitted from the optical transmitter 202 over the optical transmission channel 201 and then converting the signal into an electric signal to output the resulting signal. The system still further includes a channel 210 and a threshold value processing portion 205 for performing threshold value processing on the electric signal delivered from the optical receiver 203. The system further includes a receiver-side key generator portion 207 for communicating with the transmission-side key generator portion 206 over the channel 210 in accordance with the output from the threshold value processing portion 205 to perform processing for the distribution of encrypted codes, and key storage portions 208, 209 for storing shared encrypted codes.

This key distribution system is characterized in that the threshold value processing portion 205 performs the following special threshold value processing. FIG. 2 is an explanatory view of the threshold value processing, illustrating the probability distribution of signals corresponding to "0" in graph 0 and that of signals corresponding to "1" in graph 1. According to a general threshold value determination, a threshold value is specified at position "a". The value of a signal is determined to be "1" if the value is less than the threshold value and "0" if the value is greater than the threshold value. In contrast to this, according to the YK protocol, a threshold value is placed at positions "b" and "c". The value of a signal is determined to be "1" if the value is less than the threshold value b, "0" if the value is greater than the threshold value c, and "undeterminable" otherwise. The YK protocol employs weak light for transmission to be intentionally vulnerable to the effects of noise, thereby increasing an overlap between the graph 0 and graph 1. This makes it difficult for an eavesdropper to intercept the key due to an increased probability of an erroneous determination even when the threshold value processing is performed with the threshold value being placed at "a" so that the eavesdropper can have the optimum eavesdropping method. In addition, suppose that the eavesdropper has placed the threshold value at the positions "b" and "c". In this case, since the noise of the receiver of the eavesdropper is independent of the noise of the optical receiver 203 of the authorized user, there is a discrepancy in the position of a determinable bit between the two parties. It is thus also difficult to intercept the encrypted code.

This makes it possible to realize a highly secure system against the eavesdropping of encrypted codes. Now, the procedure for distributing a key is explained below with reference to FIG. 3. FIG. 3 is a flow diagram illustrating the procedure for distributing a key by the Yuen scheme. First, the transmission-side key generator portion 206 generates random numbers to produce a "0" and "1" bit train, and then transmits the information using the modulator 204, the optical transmitter 202, and the optical transmission channel 201 (401). The signal received by the optical receiver 203 is subjected to the aforementioned threshold value processing in the threshold value processing portion 205, and then the resulting signal is passed to the receiver-side key generator portion 207 (402). The receiver-side key generator portion 207 transmits the position of the resulting undeterminable bit to the transmission-side key generator portion 206 over the channel 210 (403). The transmission-side key generator portion 206 and the receiver-side key generator portion 207 discard the undeterminable bit to store the remaining bits as the shared key in each of the key storage portions 208, 209 (404 and 405). The transmission-side key generator portion 206 and the receiver-side key generator portion 207 communicate and agree with each other to confirm the value of a bit placed at a randomly specified position in the bit train stored, respectively, and then check if those values agree with each other. When this processing is repeated several times to yield the ratio of disagreement greater than a predetermined value R, which is indicative of the presence of an eavesdropper, the key stored in the key storage portion is discarded.

Unlike the quantum cryptography using the quantum mechanical property of light, the Yuen scheme employs classical noise, and thus it is pointed out that there is a possibility of using an amplifier. (Refer to H. P. Yuen and A. M. Kim, "Classical noise-based cryptography similar to two-state quantum cryptography", Physics Letter A. 241, pp135-138 (1998)). This is one of the substantial advantages of the YK protocol over the quantum cryptography.

However, in the aforementioned technical literature, it is pointed out only in principle that there is a possibility of providing a repeater (by optical amplification) for a coherent optical transmission, but no specific implementing method is described in the literature. Furthermore, for the coherent optical transmission, polarized waves are unstable in the optical fiber and therefore it is difficult to use the coherent optical transmission under the condition of such a low S/N ratio.

SUMMARY OF THE INVENTION

A key distribution method according to the present invention enables the long-distance transmission of a key as follows. That is, one or more amplifiers are provided in a signal transmission channel or the path through which a signal passes, where the amplifiers have the gain predetermined in accordance with the loss of the channel. Upon receiving the signal, the signal is amplified by means of a front-end amplifier having a gain which is greater than that of the amplifiers in the transmission channel and which is equal to or greater than the gain that the eavesdropper can use.

According to an aspect of the present invention having the aforementioned configuration, a method for distributing a key is provided which makes use of effects of noise caused at the time of transmitting or receiving a signal to send a key. The method is adapted that a transmission signal is amplified at a plurality of stages while a relationship between the transmission signal and noise is being maintained at a level enough to satisfy predetermined criteria for security measures against eavesdropping activities, and the key is sent over a long distance. This provides the method with an action and effect of allowing a key to be transmitted over a long distance.

In the aforementioned method for distributing a key, the present invention is also adapted that as the distance between a transmitter and a receiver increases, the transmission signal is amplified at stages greater in number on a signal transmission channel. This serves to effectively recover the attenuation of the signal. The method is thereby provided with an action and effect of allowing a key to be transmitted over a long distance while the relationship between the transmission signal and noise is being maintained at a level enough to satisfy predetermined criteria for security measures against eavesdropping activities. The present invention also provides a key distribution system. The system includes key transmitting means for transmitting a key on a signal transmission channel and key receiving means for receiving the key transmitted by the key transmitting means. The system also includes the signal transmission channel, interposed between the key transmitting means and the key receiving means, for transmitting a signal, a plurality of amplifiers, installed on the signal transmission channel, having a gain for recovering an attenuation of the signal in the signal transmission channel, and a front-end amplifier, coupled to an input side of the key receiving means, having a gain higher than the gain of said amplifier. The system is adapted that the transmission signal is amplified at a plurality of stages while a relationship between the transmission signal and noise is being maintained at a level enough to satisfy predetermined criteria for security measures against eavesdropping activities. This provides the system with an action and effect of allowing a key to be transmitted over a long distance.

In the aforementioned key distribution system, the present invention is also adapted that upon transmitting and receiving the key, an optical signal is transmitted and received using an intensity modulation and direct detection (IMDD) scheme. The system is also characterized in that as the amplifier, such an amplifier is used that has a gain for recovering an attenuation in a transmission channel having a short distance of about 5 km or less. This provides the system with an action and effect of allowing a key to be transmitted over a key distribution distance longer than the distance (several tens of kilometers) which is achieved currently by the quantum cryptography system.

In the aforementioned key distribution system, the present invention is also adapted that as the front-end amplifier, a front-end amplifier having a gain greater than that of the amplifiers in the signal transmission channel and equal to or greater than a gain available to an eavesdropper is used. This provides the system with an action and effect of realizing a key distribution system having much higher performance (with a transmission distance of 100 km, a key transmission rate of 100 k[bps], and a bit error rate of $1 \times 10^{-4}$) than the performance of the currently achieved quantum cryptography system (with a transmission distance of several tens of kilometers, a key transmission rate of 30 to 200 [bps], and a bit error rate of $4 \times 10^{-2}$).

In the aforementioned key distribution system, the present invention is also adapted to have, as the front-end amplifier, a front-end amplifier having a gain of about 50 dB. This provides the system with an action and effect of realizing a key distribution system having much higher performance (with a transmission distance of 100 km, a key transmission rate of 100 k[bps], and a bit error rate of $1 \times 10^{-4}$) than the performance of the currently achieved quantum cryptography system (with a transmission distance of several tens of kilometers, a key transmission rate of 30 to 200 [bps], and a bit error rate of $4 \times 10^{-2}$).

It is the object of the present invention to provide a method and system for distributing a key which realize the distribution of the key over a long distance while, using the IMDD scheme, the relationship between the transmission signal and noise is being maintained at a level enough to satisfy predetermined criteria for security measures against eavesdropping activities.

These object and advantages of the present invention will be more fully apparent from the following embodiments to be described with reference to the accompanying drawings.

DETAILED DESCRIPTION OF THE PREFERRED EMBODIMENTS

Figure 1:
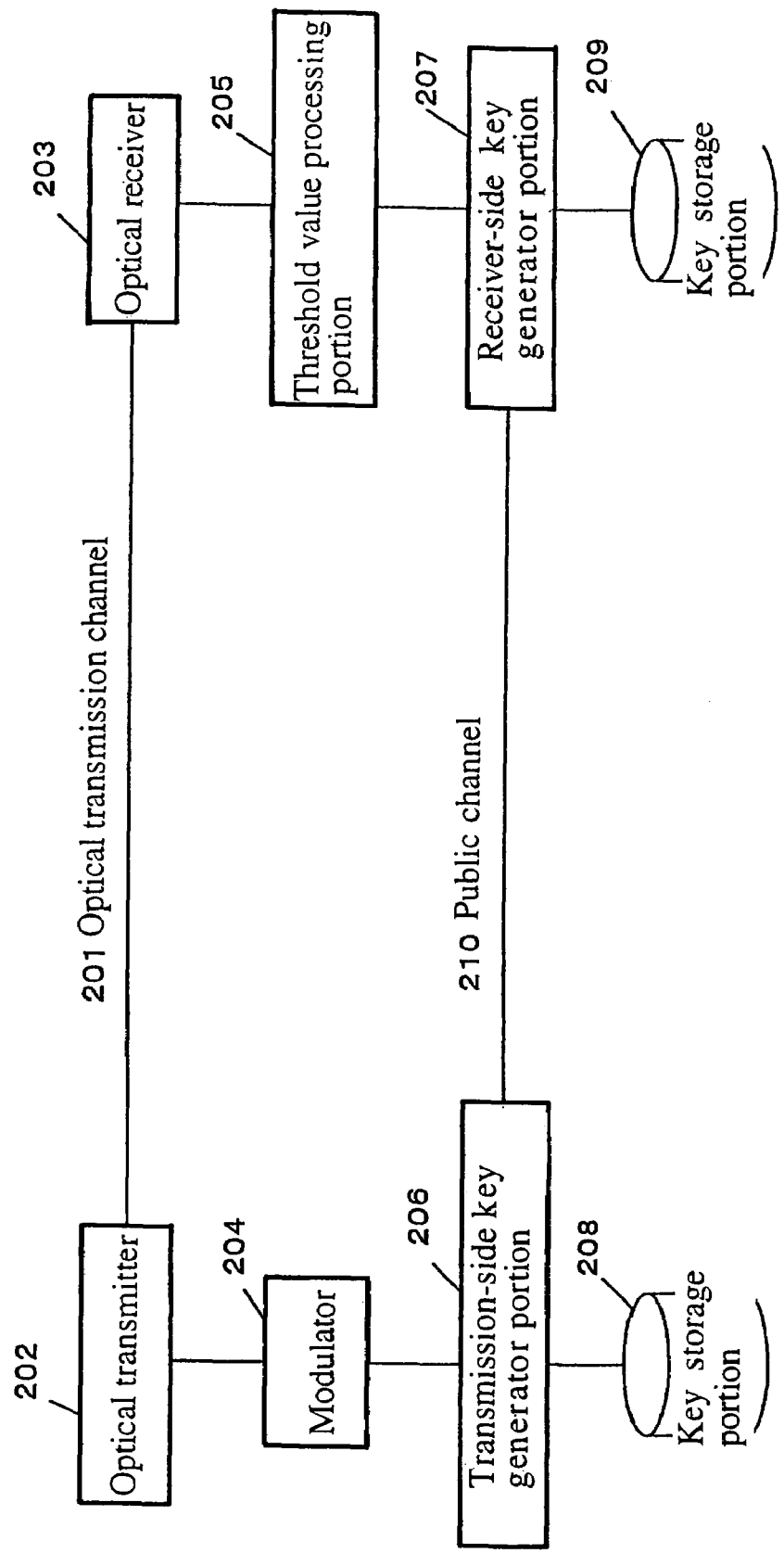
FIG. 1 is a block diagram illustrating a prior-art key distribution system for realizing the YK protocol.
Figure 2:
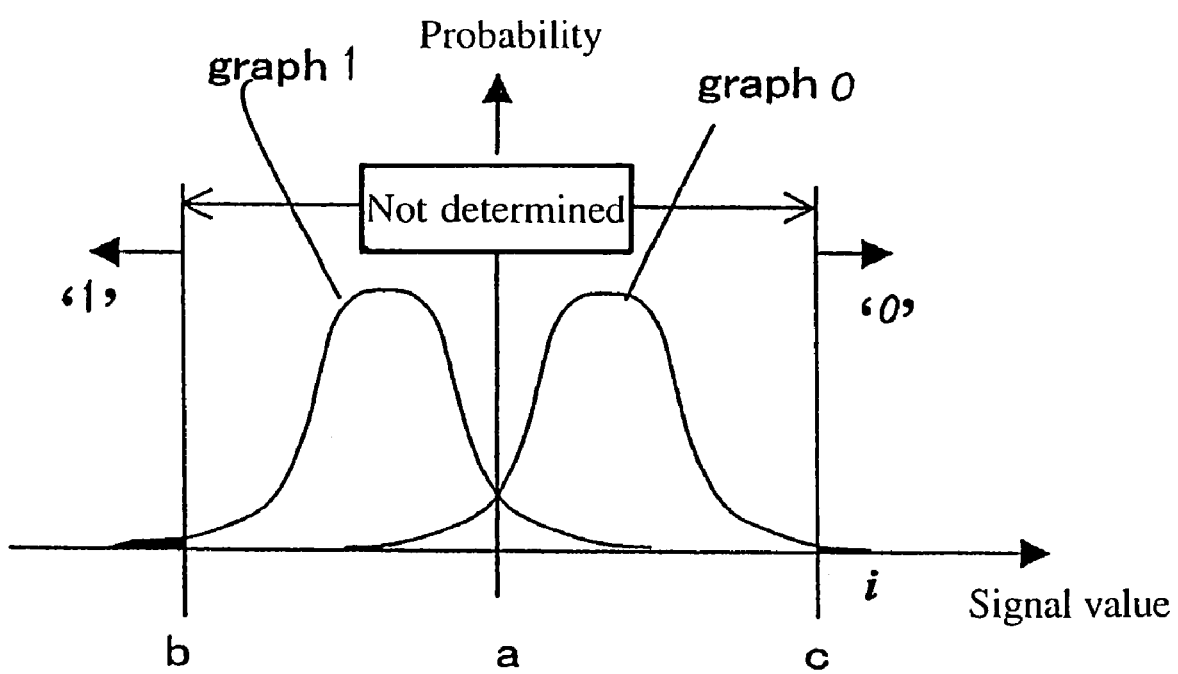
FIG. 2 is an explanatory view illustrating a scheme for determining a threshold value used in the YK protocol.
Figure 3:
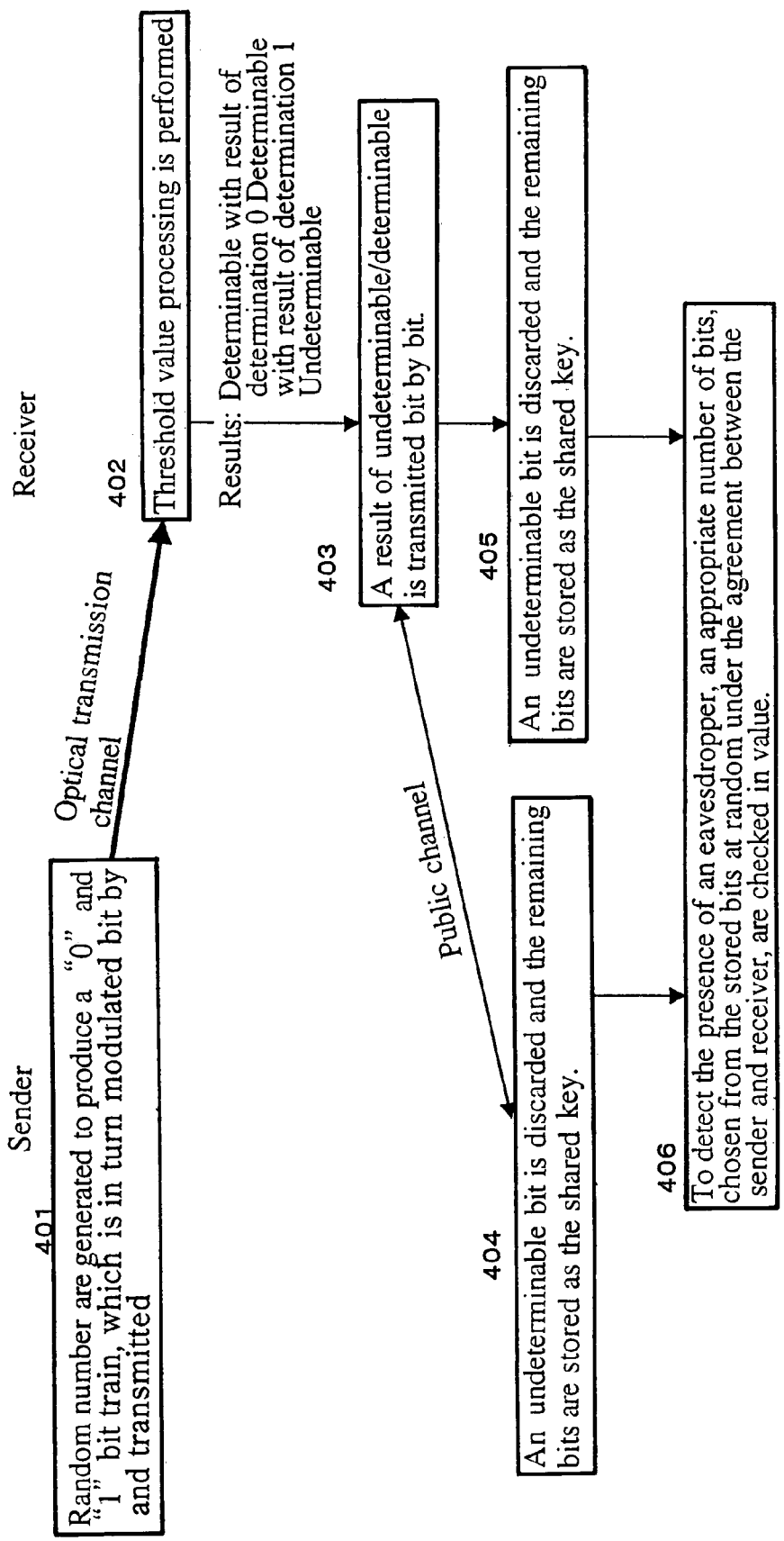
FIG. 3 is a flow diagram illustrating the determination of a threshold value used in the YK protocol.
Figure 4:
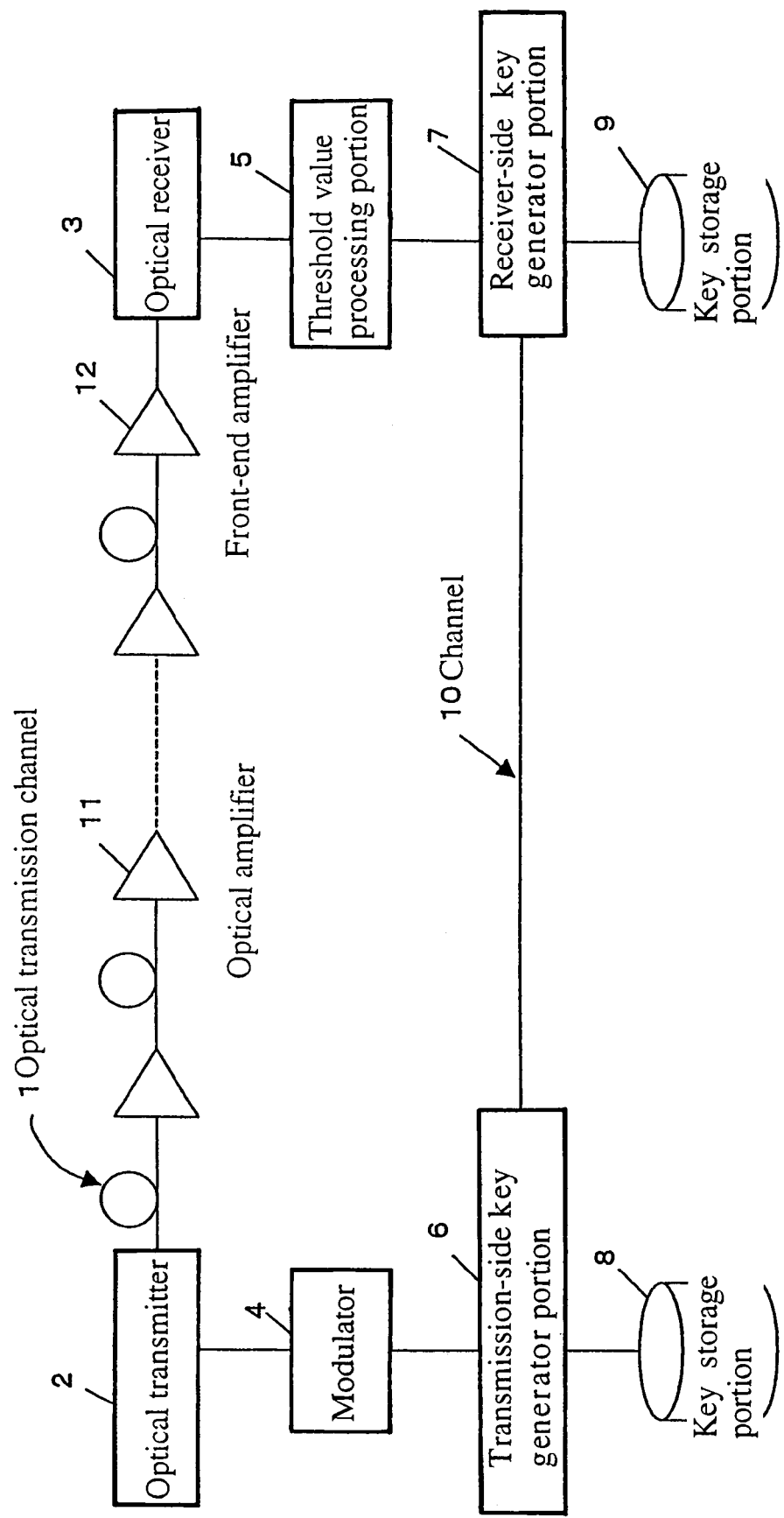
FIG. 4 is a block diagram illustrating a key distribution system according to an embodiment of the present invention.

Now, the present invention will be explained below in accordance with the embodiments. FIG. 4 is a block diagram illustrating the configuration of a key distribution system according to an embodiment of the present invention. Referring to FIG. 4, the system includes an optical transmission channel 1 (an optical fiber) serving as a signal transmission path, an optical transmitter 2 (a light-emitting diode) serving as key transmitting means, an optical receiver 3 (a photodiode) serving as key receiving means, and a modulator 4 for modulating a transmission signal. The system also includes a threshold value processing portion 5 for performing the threshold value processing on the Yuen encrypted code, and a transmission-side key generator portion 6 for executing the protocol for the distribution of a key such as generating random numbers to require the transmission of a bit train. The system further includes a receiver-side key generator portion 7 for executing the protocol for the distribution of a key such as communicating with the transmission-side key generator portion 6 in accordance with the result delivered from the threshold value processing portion 5. The system still further includes key storage portions 8 and 9 for storing the keys delivered from the transmission-side key generator portion 6 and the receiver-side key generator portion 7, respectively, and a channel 10 for communications between the transmission-side key generator portion 6 and the receiver-side key generator portion 7. In addition, the system includes an amplifier or an optical amplifier 11 installed for recovering the attenuation of an optical signal on the optical transmission channel 1, and a front-end amplifier 12 installed at the input side of the optical receiver 3 to amplify the optical signal to a level at which a bit can be checked.

Now, described below is the operation of the key distribution system configured as described above. The operation of the transmission-side key generator portion 6 and the receiver-side key generator portion 7 is entirely the same as that of the transmission-side key generator portion 206 and the receiver-side key generator portion 207 for the YK protocol as described with reference to FIGS. 4 and 5. Described below is the operation of the other components. This embodiment employs the intensity modulation and direct detection (IMDD) scheme which is most widely used in a practical optical communication. In addition, the Manchester encoding method is employed as the encoding method. In this case, the modulator 4 modulates "0" with a first slot being "on" and a second slot being "off" and "1" with a first slot being "off" and a second slot being "on". The optical transmitter 2 converts an electric signal received from the modulator 4 into an optical signal, which is in turn transmitted to the optical receiver 3 over the optical transmission channel 1.

The optical receiver 3 receives the optical signal transmitted from the optical transmitter 2 and then converts the signal to an electric signal for output. The threshold value processing portion 5 performs the threshold value processing of the YK protocol, described with reference to FIG. 4, on the value obtained by subtracting the current value of the second slot of the electric signal delivered from the optical receiver 3 from that of the first slot. Consider the probability distribution of the values obtained by subtracting the second slot from the first slot. In this case, it can be found from the configuration method that probability distributions of p0(i) and p1 (i) are obtained which have a positive average for "0", a negative average for "1", and an equal variance. The probability distributions of p0(i) and p1(i) are given by Equations (1) and (2). That is, $$P_0(i) = \frac{1}{\sqrt{2\pi(8kTB/R + 2e^2NB)}} \exp\left[-\frac{(i + \sqrt{e^2 N^2})^2}{2((8kTB/R + 2e^2NB))}\right] \quad \text{(Equation 1)}$$

$$P(i) = \frac{1}{\sqrt{2\pi(8kTB/R + 2e^2NB)}} \exp\left[-\frac{(i + \sqrt{e^2 N^2})^2}{2((8kTB/R + 2e^2NB))}\right] \quad \text{(Equation 2)}$$

where k is the Boltzmann's constant [J/K], T is the temperature [K], B is the bandwidth [Hz], R is the front-end resistance [Ω], "e" is the electron charge [C], and N is the number of photons transmitted [pieces/sec].

Incidentally, as the modulation and demodulation scheme (the operation of the modulator 4 and (part of) the threshold value processing portion 5), schemes other than the intensity modulation and direct detection method may be employed. The optical amplifiers 11, k in number, are installed, at equal intervals between the optical transmitter 2 and the front-end amplifier 12. Although the optical amplifiers 11 need not to be disposed at equal intervals, it is to be understood that the optical amplifiers 11 are arranged at equal intervals in the interests of simplicity in evaluation. The optical amplifier 11 is provided with a gain for recovering attenuation. That is, the gain G is given by G=1/λr where λr is the attenuation factor of the number of photons between optical amplifiers. Incidentally, the attenuation factor of the number of photons can be calculated by Equation 3. That is, $$\lambda = 10^{-0.1 \alpha L} \quad \text{(Equation 3)}$$

where α is the power loss coefficient [dB/km] and L is the length of the fiber [km].

The gain Gp of the front-end amplifier 12 is set to a level substantially equal to the gain Gp' that is assumed to be that of a front-end amplifier of the eavesdropper. Furthermore, it is preferable to set the gain Gp of the front-end amplifier 12 to a predetermined value of Gp" taking it into account that an arbitrary value may be set to the gain Gp' of the eavesdropper. In this case, it is preferable to set the gain Gp" to values ranging from 40 dB to 60 dB. It is also preferable to set the number k of the optical amplifiers 11 such that the distance between amplifiers becomes as short as possible.

One of the features of the present invention is to set the distance between the optical amplifiers 11 and the gain of the front-end amplifier 12 to an appropriate value. Now, shown below are the calculation simulation results of the optimum values. Shown first is the calculation simulation result of the gain of the front-end amplifier 12. Suppose that the power loss coefficient of the optical fiber is $\alpha=0.2$ [dB/km], the number of photons transmitted is $N=2.1\times10^{10}$ [pieces/sec], the temperature is $T=300$ [K], the bandwidth is $B=1$ [GHz] (which corresponds to a bit rate of 1 [Gbps] in the Manchester codes), the resistance of the front end is $R=50$ [Ω], the spontaneous emission coefficient is nsp=1, and the half width of the filter is $\Delta f=5$ [nm]. The performance of the system depends on the power loss α of the optical fiber; however, the aforementioned $\alpha=0.2$ is generally the theoretical limit of the silica-based fiber. In order to obtain a loss property less than that, it is indispensable to use an entirely different material such as a fluoride optical fiber. However, it is difficult to put it into practical use (i.e., it requires high costs and thus will not be conceivably made available soon). For example, materials employed for the fluoride optical fiber include $CaF_2$, $MgF_2$, and $BaF_2$.

On the other hand, it is to be understood that the threshold value is determined so that the determinable bit has a probability of being incorrect of $1\times10^{-4}$ on the presumption that the eavesdropper uses a front-end amplifier of gain 100 [dB] for interception immediately after a transmission by a sender.

Figure 5:
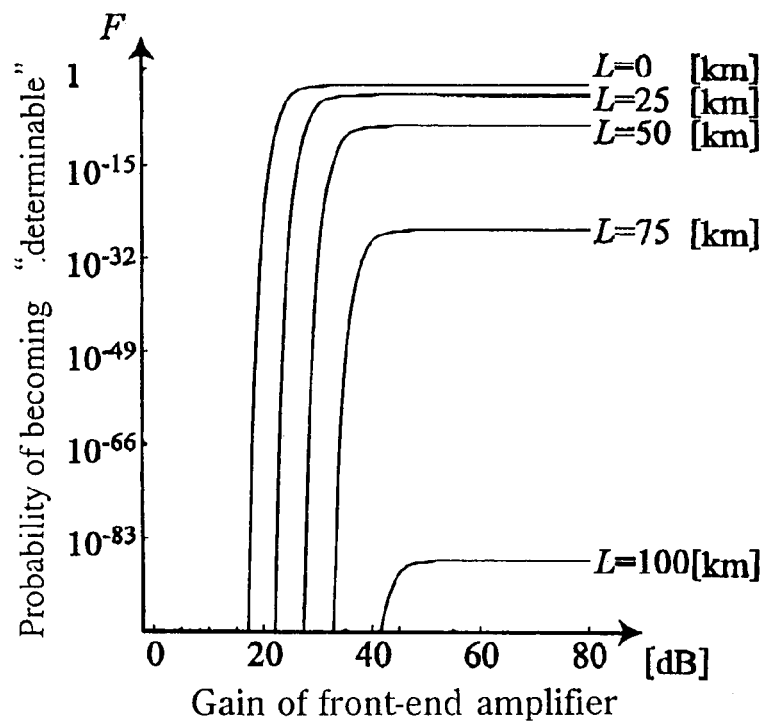
FIG. 5 is a graph showing the relationship between the gain of a front-end amplifier and the probability F of becoming determinable in the aforementioned embodiment when the threshold value has been determined so that the determinable bit has a probability of being incorrect of $10^{-4}$.

FIG. 5 is a graph showing the relationship between the gain Gp of the front-end amplifier 12 and the probability F of a bit of becoming determinable in this case. Suppose that the front-end amplifier 12 is not used and no photons are attenuated in number (i.e., Gp=1 and L=0). In this case, the probability F of a bit of becoming determinable is equal to $8.5\times10^{-266282}$, which allows the bit to be hardly detected. However, letting the gain of the front-end amplifier 12 be 50 [dB], the relation between the total length [km] of the fiber and the probability F is as follows. That is, F=0.79 for L=0,
F=0.022 for L=25,
$F=2.2\times10^{-8}$ for L=50,
$F=1.5\times10^{-27}$ for L=75, and
$F=5.5\times10^{-88}$ for L=100.

Thus, this tells that the system can increase the probability of adopting a signal. From the foregoing, it is found useful for a receiving person to use the front-end amplifier 12.

Another feature of the present invention is to set the distance between the optical amplifiers 11 disposed on the optical transmission channel 1 to an appropriate value. From a different point of view, the feature is to set the number of optical amplifiers 11 disposed on the optical transmission channel 1 to an appropriate value over a certain optical transmission distance.

Now, the distance between optical amplifiers 11 is considered. Suppose that the power loss coefficient of the optical fiber is $\alpha=0.2$ [dB/km], the number of photons transmitted is $N=2.1\times10^{10}$ [pieces/sec], the temperature is $T=300$ [K], the bandwidth is $B=1$ [GHz] (which corresponds to a bit rate of 1 [Gbps] in the Manchester codes), the resistance of the front end is $R=50$ [Ω], the spontaneous emission coefficient is nsp=1, the half width of the filter is $\Delta f=5$ [nm], and the gain of the front-end amplifier 12 is Gp=50 [dB]. In addition, suppose that the threshold value is determined so that the determinable bit has a probability of being incorrect of $1\times10^{-4}$ on the presumption that the eavesdropper uses a front-end amplifier of gain 100 [dB] for interception immediately after a transmission by a sender.

Figure 6:
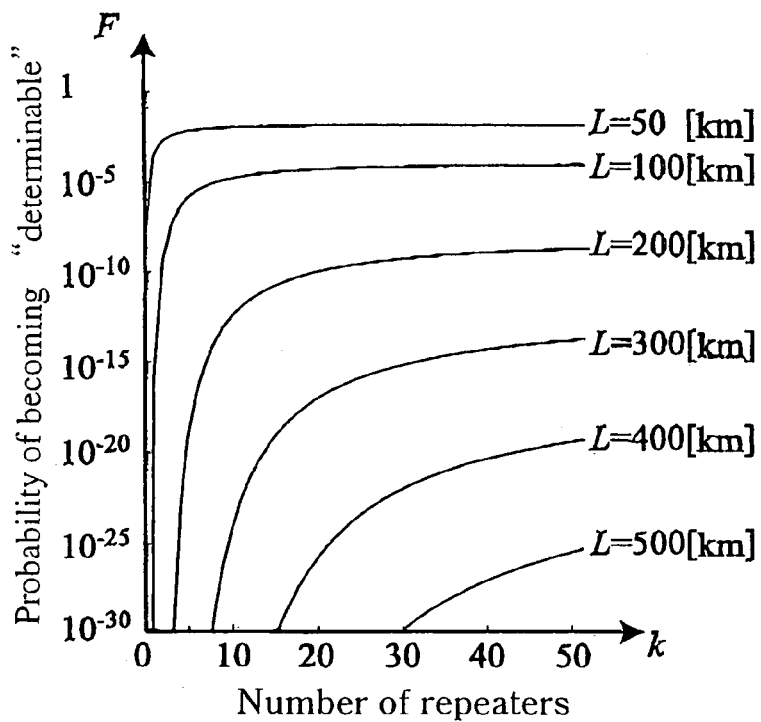
FIG. 6 is a graph showing the relationship between the number k of optical amplifiers and the probability F of becoming determinable in the aforementioned embodiment when the threshold value has been determined so that the determinable bit has a probability of being incorrect of $1 \times 10^{-4}$ assuming that the front-end amplifier is used for eavesdropping.

FIG. 6 is a graph showing the relationship between the number k of the optical amplifiers 11 and the probability F of a bit of becoming determinable at this time. Assuming that the optical amplifiers 11 are installed at 5 [km] intervals, the relationship between the installation interval (or Lm [km]) of the optical amplifiers 11 and the probability F is as follows. That is, $F=9.5\times10^{-3}$ for Lm=50 [km](k=9),
$F=5.2\times10^{-5}$ for Lm=100 [km] (k=19),
$F=1.4\times10^{-9}$ for Lm=200 [km] (k=39),
$F=3.5\times10^{-14}$ for Lm=300 [km](k=59),
$F=9.1\times10^{-19}$ for Lm=400 [km] (k=79), and
$F=2.4\times10^{-23}$ for Lm=500 [km] (k=99).

As described above, when only the front-end amplifier 12 is used, $F=2.2\times10^{-8}$ for L=50 [km] and $F=5.5\times10^{-88}$ for L=100 [km]. This shows that the optical amplifiers 11 can be used as repeaters to thereby increase the probability F of a bit of becoming determinable. In addition, since the bit rate is 1 [Gbps], the aforementioned setting would be conceivably sufficient for practical use with L=100 [km]. Incidentally, in the aforementioned simulation, the optical amplifiers 11 are disposed at 5 [km] intervals and the front-end amplifier 12 is provided with a gain of 50 [dB]. However, the setting may be carried out in accordance with FIGS. 5 and 6 such that the probability of becoming "determinable" is made higher than the reference value. For example, suppose that the front-end amplifier 12 is provided with a gain of 50 [dB] and the optical amplifiers 11 are installed at 1 [km] intervals. In this case, a key transmission rate of 100 k[bps] can be realized for an encryption transmission distance of L=100 [km]. Among other things, the shorter the installation interval between optical amplifiers 11, the better the key transmission capability.

In a key distribution system in accordance with the YK protocol for sending a key by making use of the effects of noise caused at the time of transmitting or receiving a signal, the present invention is adapted that the transmission signal is amplified at multiple stages while the relationship between the transmission signal and noise is maintained at a level enough to satisfy predetermined criteria for security measures against eavesdropping activities. Thus, this makes it possible to realize a key distribution system having much higher performance (with a transmission distance of 100 km, a key transmission rate of 100 k[bps], and a bit error rate of $1\times10^{-4}$) than the performance of the currently achieved quantum cryptography system (with a transmission distance of several tens of kilometers, a key transmission rate of 30 to 200 [bps], and a bit error rate of $1\times10^{-2}$).

The present invention has been explained in accordance with the preferred embodiments illustrated in the drawings. However, it is obvious that those skilled in the art can make easily changes and modifications without departing from the spirit of the present invention, and those changes are to be included in the scope of the present invention.

What is claimed is:

1. A method for distributing an encryption key using Yuen encryption, the method for sending an encryption key by making use of effects of noise caused at the time of transmitting or receiving a signal, wherein a transmission signal attenuated in the signal transmission channel between each amplifier is recovered by using a plurality of amplifiers installed on the signal transmission channel; and a transmitter and a receiver transmits and receives the encryption key over a long distance in a manner that a relationship between the transmission signal and noise is being maintained at a level enough to satisfy predetermined criteria for security measures against eavesdropping activities.

2. An encryption key distribution system distributing an encryption key using Yuen encryption comprising
encryption key transmitting means for transmitting an encryption key on a signal transmission channel,
encryption key receiving means for receiving the encryption key transmitted by the encryption key transmitting means,
a signal transmission channel, interposed between the encryption key transmitting means and the encryption key receiving means, for transmitting a signal,
a plurality of amplifiers, installed on the signal transmission channel, having a gain for recovering an attenuation of the signal in the signal transmission channel, and
a front-end amplifier, coupled to an input side of the encryption key receiving means, having a gain higher than the gain of said amplifier, wherein
each of said plurality of amplifiers recovers a transmission signal attenuated in the signal transmission channel between each amplifier,
the encryption key transmission means and the encryption key receiving means transmits and receives the encryption key in a manner that a relationship between the transmission signal and noise is being maintained at a level enough to satisfy predetermined criteria for security measures against eavesdropping activities.

3. The encryption key distribution system according to claim 2, wherein the encryption key transmitting means and the encryption key receiving means transmits and receives an optical signal by using intensity modulation and direct detection (IMDD) scheme, and the amplifier has a gain for recovering an attenuation in a transmission channel having a short distance of about 5 km or less.

4. The encryption key distribution system according to claim 3, wherein
as the front-end amplifier, a front-end amplifier having a gain greater than that of the amplifiers in the signal transmission channel and equal to or greater than a gain available to an eavesdropper is used.

5. The encryption key distribution system according to claim 3, comprising
as the front-end amplifier, a front-end amplifier having a gain of about 50 dB.

* * * * *